(12) United States Patent
Caimi

(10) Patent No.: US 8,588,717 B2
(45) Date of Patent: Nov. 19, 2013

(54) HEADPHONE ANTENNA FOR RADIO COMMUNICATIONS DEVICE

(75) Inventor: Frank M. Caimi, Vero Beach, FL (US)

(73) Assignee: Skycross, Inc., Fremont, CA (US)

( * ) Notice: Subject to any disclaimer, the term of this patent is extended or adjusted under 35 U.S.C. 154(b) by 36 days.

(21) Appl. No.: 13/337,789

(22) Filed: Dec. 27, 2011

(65) Prior Publication Data

US 2012/0171976 A1 Jul. 5, 2012

Related U.S. Application Data

(60) Provisional application No. 61/428,540, filed on Dec. 30, 2010.

(51) Int. Cl.
*H04B 1/18* (2006.01)
(52) U.S. Cl.
USPC .................. 455/193.1; 455/90.3; 455/575.2; 455/121; 455/179.1
(58) Field of Classification Search
USPC ............... 455/193.1, 90.3, 575.2, 121, 179.1
See application file for complete search history.

(56) References Cited

U.S. PATENT DOCUMENTS

| 4,369,521 | A | 1/1983 | Sawada |
| 7,911,401 | B2 | 3/2011 | Yoshino et al. |
| 7,917,112 | B2 * | 3/2011 | Rofougaran ............... 455/193.1 |
| 2005/0181844 | A1 | 8/2005 | Edeler et al. |
| 2006/0014560 | A1 | 1/2006 | Yoshino |
| 2007/0032130 | A1 | 2/2007 | Yoshino |
| 2007/0149247 | A1 * | 6/2007 | Wong ............................ 455/557 |
| 2009/0004977 | A1 * | 1/2009 | Piovaccari et al. ........... 455/90.3 |
| 2009/0033572 | A1 * | 2/2009 | Zhu et al. ....................... 343/703 |
| 2009/0197551 | A1 * | 8/2009 | Paraskake et al. ......... 455/179.1 |
| 2010/0267350 | A1 * | 10/2010 | Kasha et al. .................. 455/121 |

FOREIGN PATENT DOCUMENTS

| EP | 1855351 A1 | 11/2007 |
| JP | 2008-177731 A | 7/2008 |
| KR | 2010-0082646 A | 7/2010 |

OTHER PUBLICATIONS

International Search Report and Written Opinion for PCT/2011/067327, dated Sep. 12, 2012.

* cited by examiner

*Primary Examiner* — Sanh Phu
(74) *Attorney, Agent, or Firm* — Guntin & Gust, PLC; Ed Guntin

(57) ABSTRACT

A radio communications device includes a headphone assembly, which includes at least one aural speaker or transducer and a headphone cable functioning as an antenna and providing electrical signals carrying audio information to the at least one aural speaker or transducer. A signal separator coupled to the headphone cable separates the electrical signals carrying audio information transmitted to the headphone cable and radio frequency (RF) signals received from the headphone cable. A radio receiver receives the RF signals from the signal separator and converts the RF signals to electrical signals carrying audio information. A tuner is provided for tuning the headphone cable to a selected operating frequency of the radio receiver. An audio amplifier amplifies electrical signals carrying audio information from the radio receiver to be transmitted through the headphone cable to the at least one aural speaker or transducer.

21 Claims, 4 Drawing Sheets

HEADPHONE ANTENNA FOR RADIO COMMUNICATIONS DEVICE

CROSS REFERENCE TO RELATED APPLICATION

This application claims priority from U.S. Provisional Patent Application No. 61/428,540, filed on Dec. 30, 2010, entitled HEADPHONE ANTENNA FOR RADIO COMMUNICATIONS DEVICE, which is hereby incorporated by reference.

BACKGROUND

The present application relates generally to headphone antennas for radio communications devices, including tablet computers and other multimedia platforms.

Headphones with cables that serve as both an antenna and as an audio cable for earpiece speakers are known in the art, particularly for FM radio reception.

The present application is directed to a headphone antenna system that provides improved antenna performance in various radio frequency bands including, but not limited to, VHF (high), VHF (low), FM, and UHF bands.

BRIEF SUMMARY OF THE DISCLOSURE

A radio communications device in accordance with one or more embodiments includes a headphone assembly, which includes at least one aural speaker or transducer and a headphone cable functioning as an antenna and providing electrical signals carrying audio information to the at least one aural speaker or transducer. A signal separator coupled to the headphone cable separates the electrical signals carrying audio information transmitted to the headphone cable and radio frequency (RF) signals received from the headphone cable. A radio receiver receives the RF signals from the signal separator and converts the RF signals to electrical signals carrying audio information. A tuner is provided for tuning the headphone cable to a selected operating frequency of the radio receiver. An audio amplifier amplifies electrical signals carrying audio information from the radio receiver to be transmitted through the headphone cable to the at least one aural speaker or transducer.

A method of operating a radio communications device is provided in accordance with one or more further embodiments. The radio communications device includes a headphone assembly comprising at least one aural speaker or transducer and a headphone cable functioning as an antenna and providing electrical signals carrying audio information to the at least one aural speaker or transducer. The method comprises the steps of: (a) tuning the headphone cable to a selected operating frequency; (b) separating the electrical signals carrying audio information transmitted to the headphone cable and radio frequency (RF) signals received from the headphone cable; (c) converting the RF signals to electrical signals carrying audio information; and (d) amplifying electrical signals carrying audio information to be transmitted through the headphone cable to the at least one aural speaker or transducer.

BRIEF DESCRIPTION OF THE DRAWINGS

Like or identical reference numbers are used to identify common or similar elements.

DETAILED DESCRIPTION

Figure 1:
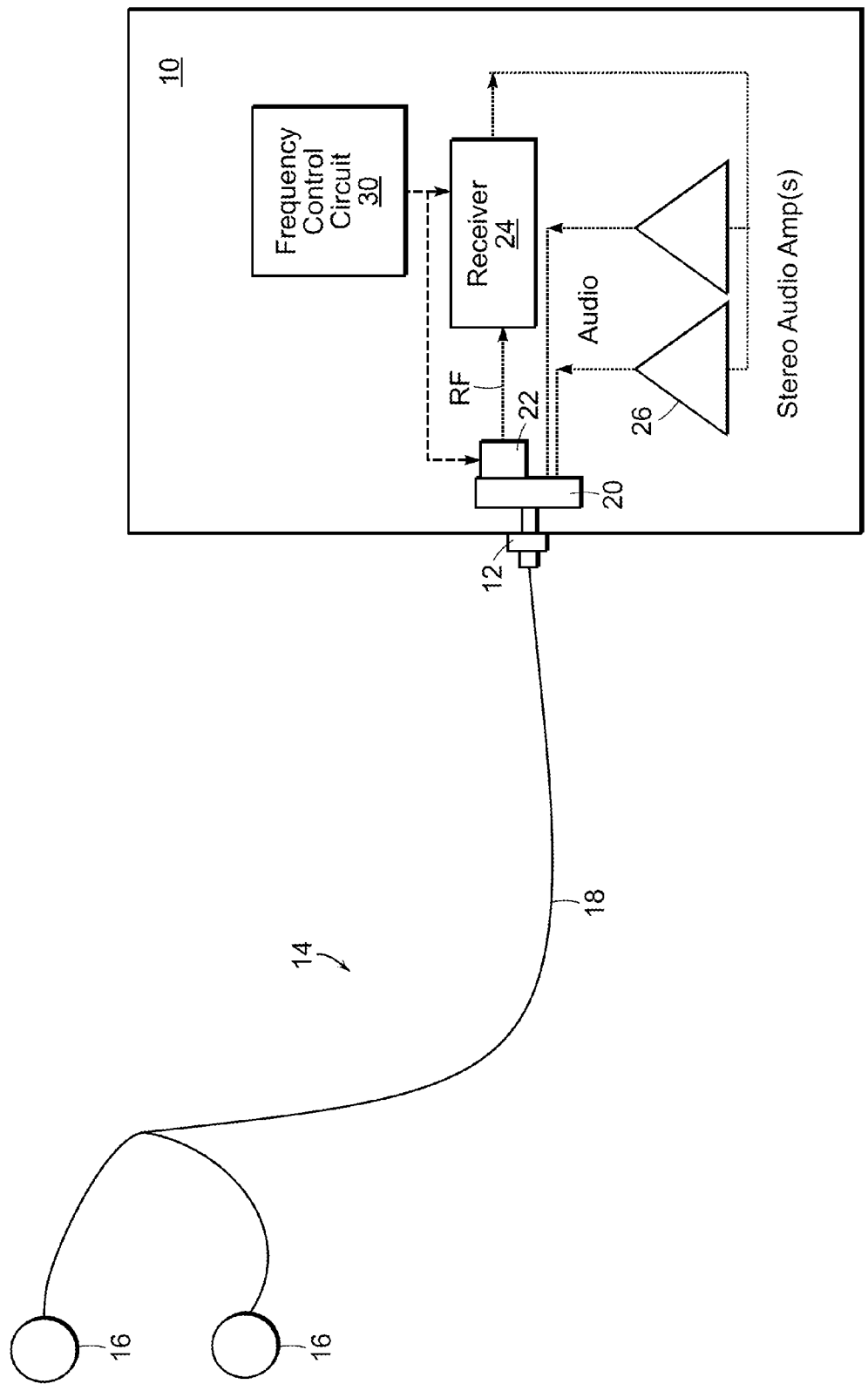
FIG. 1 schematically illustrates an exemplary headphone antenna system in accordance with one or more embodiments.

FIG. 1 illustrates an exemplary headphone antenna system in accordance with one or more embodiments. A radio communications device 10 (in this example a tablet computer or display) includes a headphone jack 12 or an electrical or electro-mechanical interface, to which a headphone assembly 14 can be attached. The headphone assembly 14 includes aural speakers or transducers 16 and a headphone cable 18 functioning as an antenna and providing electrical signals carrying audio information to the speakers 16. A signal separator 20 in the tablet computer 10 separates audio and RF signals. A match network 22 and/or impedance match tuner tunes the headphone cable 18 to the operating frequency of a radio receiver 24, and is configured to provide the generally best signal strength, signal-to-noise ratio, signal-to-interference ratio, or other signal quality parameter. The radio receiver 24 receives the RF signals from the signal separator 20 and converts the RF signals to electrical signals carrying audio information. One or more audio amplifiers 26 amplify electrical signals carrying audio information from the radio receiver 24 to be transmitted through the headphone cable 18 to the speakers 16. (As used herein, the term electrical signals carrying audio information generally refers to audio signals in digital or analog form and in various stages of processing.)

Figure 2:
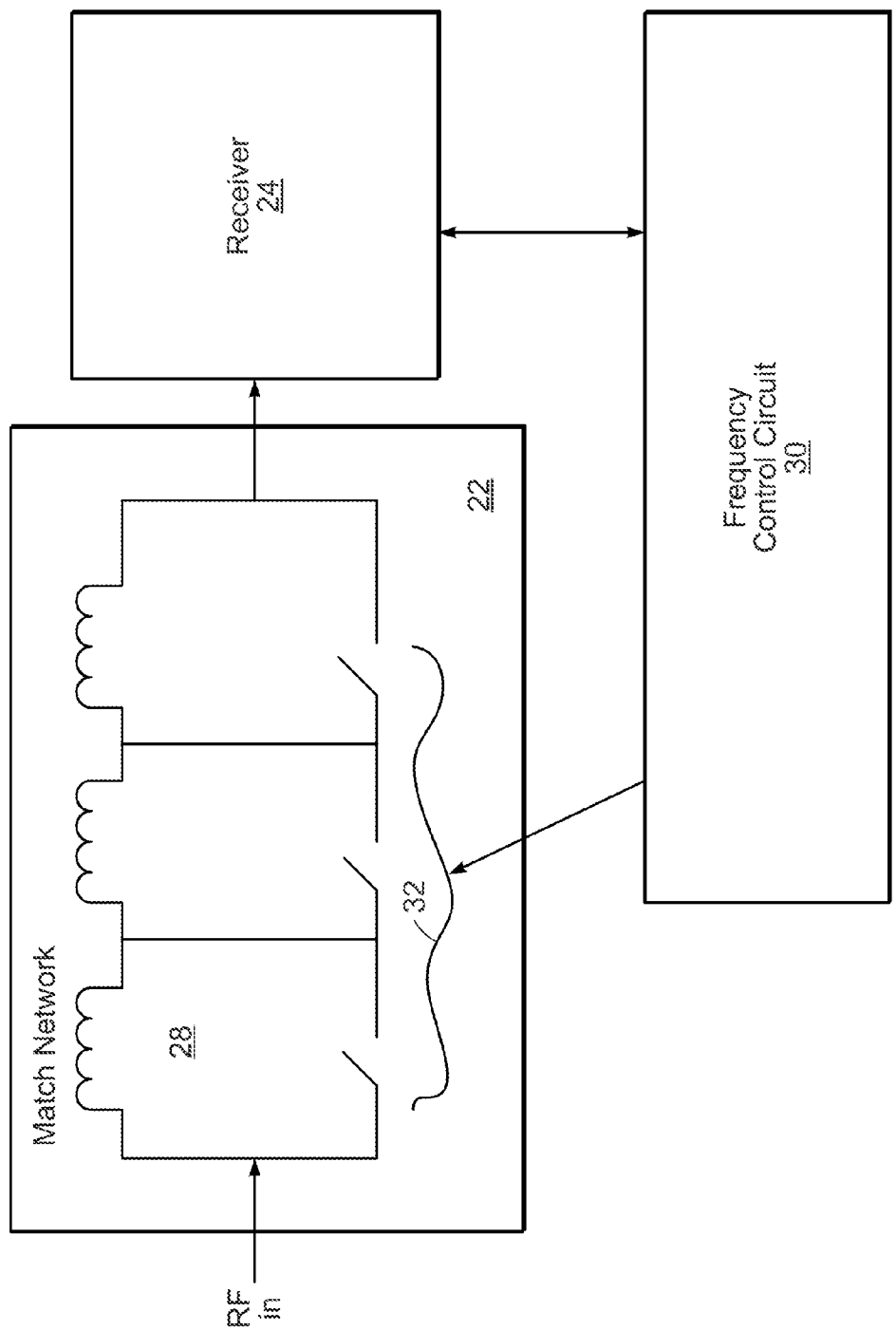
FIG. 2 schematically illustrates an exemplary match network in accordance with one or more embodiments.

FIG. 2 is a simplified schematic diagram illustrating additional details of an exemplary match network 22 in accordance with one or more embodiments. In this exemplary configuration, various inductive sections 28 may be switched "in" or "out" of the series path to the headphone cable antenna 18, thereby allowing the cable 18 to resonate as a quarter-wave, half-wave, or $n\lambda/4$ antenna (where n is any integer). A controller 30, through a control interface, enables or disables switches 32 to provide the best signal quality for a given station setting, band, or sub-band. Operating bands can include, but are not limited to, VHF (low), FM, VHF (high), and UHF bands.

Figure 3:
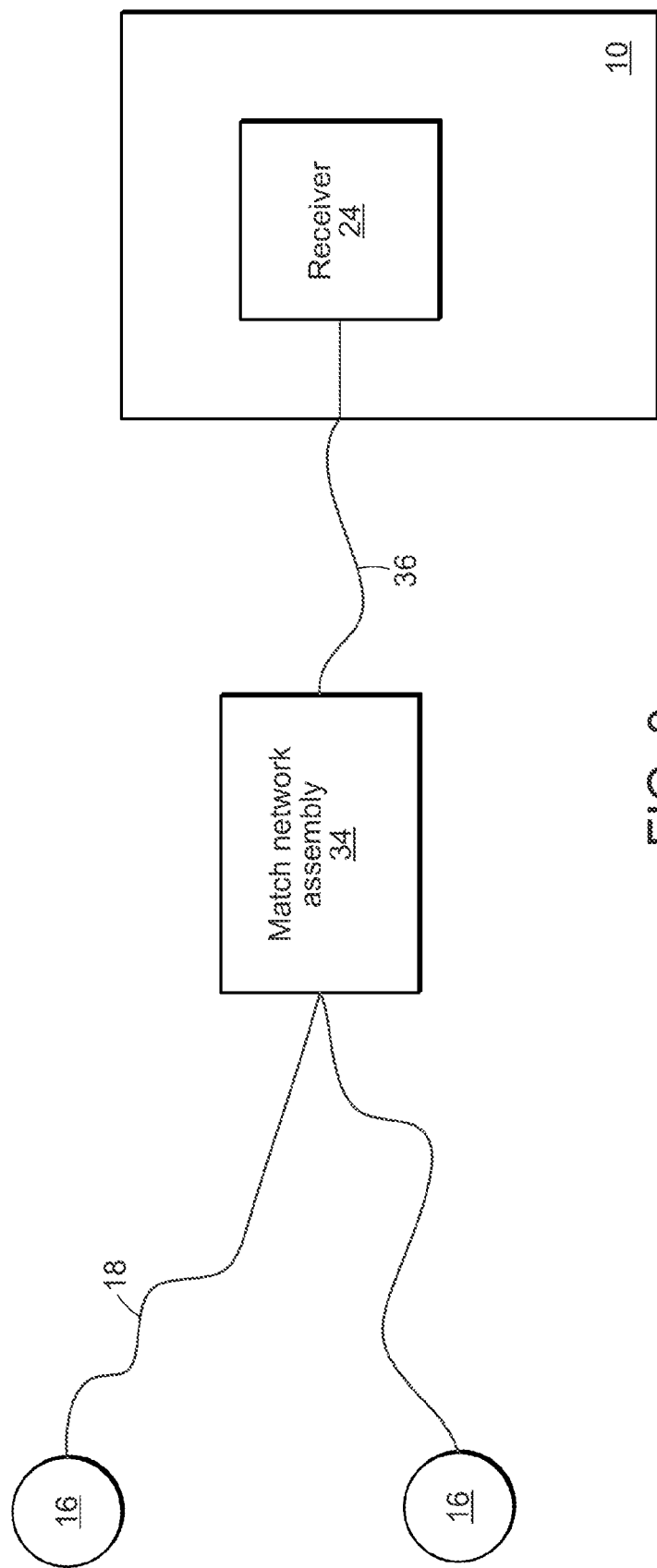
FIG. 3 schematically illustrates an exemplary headphone antenna system in accordance with one or more alternate embodiments.

Noise currents "on" or radiation from the platform 10 can render local or on-board antennas ineffective. FIG. 3 illustrates a solution that moves the active antenna portion headphone cable 18 sufficiently away from the noise sources. A match network assembly 34, which includes the signal separator 20 and match network 22, is connected by a combined cable 36 to the platform 10. The active portion of the headphone antenna 18 extends from the match network assembly 34 away from the platform 10.

In accordance with one or more embodiments, the combined cable 36 comprises at least one RF coaxial cable, two audio conductors, and an audio/RF return or common ground. Control signals for the match network 22 can be transmitted in a multiplexed fashion, either through the RF coaxial cable or on the audio conductors. Alternately, a separate additional conductor might be used for control. The match network assembly 34 may also contain an audio level control or other control features for manual adjustment of a radio station selection, R/T (Receive/Transmit) in the case where the host device serves as a two-way communications platform, or other functions.

In accordance with one or more embodiments, the headphone cable 18 can be comprised entirely of a shielded cable with the shield serving as the RF conductor or antenna. Signals carrying audio content would be carried on the conductors within the shield and would split at a junction in the case of a stereo headphone implementation.

In accordance with one or more embodiments, the headphone cable 18 can be comprised of single or paired conductors without a shielded outer conductor. The single or paired conductors serve to carry the audio information and the RF signal together. Since the RF signal is at a much higher frequency than the audio signals, the conductors can be capacitively coupled thereby appearing as a single RF conductor to the received RF signal.

In accordance with one or more further embodiments, in the FIG. 3 antenna system, the headphone cable 36 may comprise a shielded or coaxial cable. The tuner and/or match network assembly 34 is then located at a mid-cable position, and may also be configured as a single ended or balanced feed for the antenna portion 18. Cable 36 then carries the RF signal, control signals for the tuner or matching network assembly 34, as well as audio information signal from the receiver 24.

In accordance with one or more embodiments, the receiver 24 or various elements thereof may be located in the match network assembly 34 housing. In this case, power and control signals to the receiver are carried by cable 36 and audio signals are conducted to the audio transducer 16 by cable 18.

The antenna portion in FIG. 3 may represent a balanced or unbalanced antenna, which in turn may be made to resonate at or near the operating band or frequency by the match network assembly 34 by the method or methods previously described.

Figure 4:
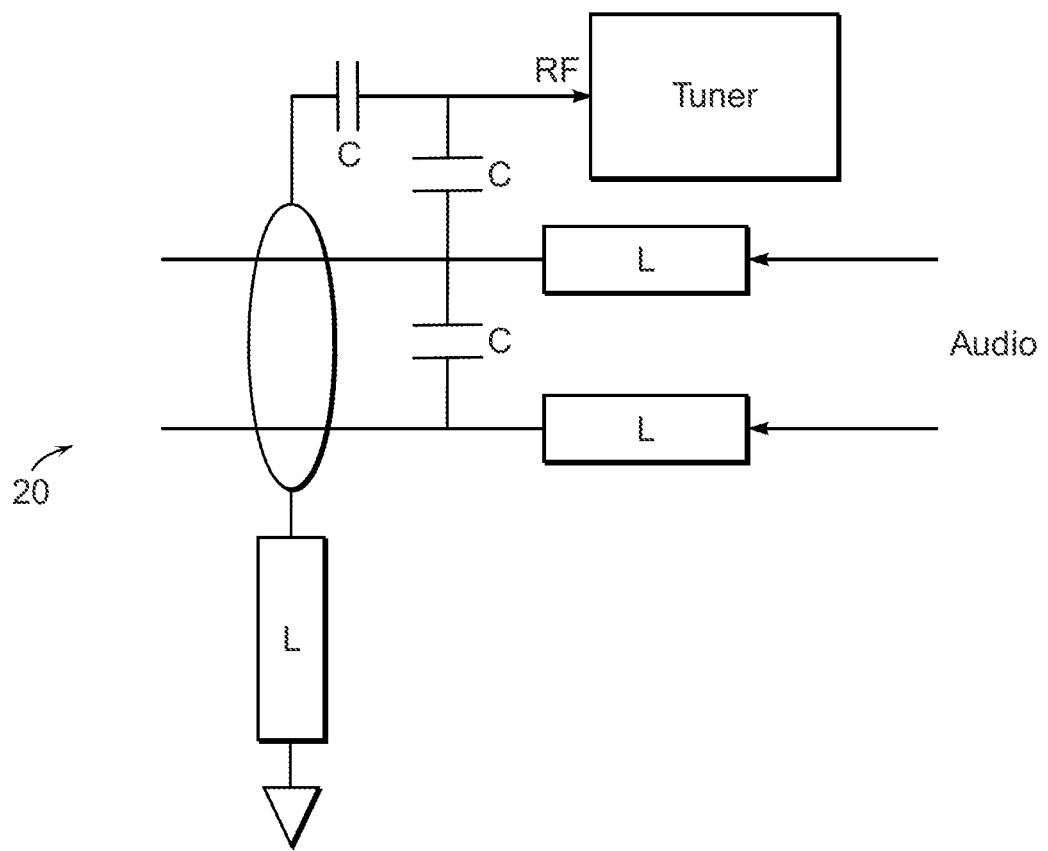
FIG. 4 schematically illustrates an exemplary signal separator in accordance with one or more embodiments.

FIG. 4 schematically illustrates an example of a simple signal separator 20 in accordance with one or more embodiments. The signal separator 20 is a simple passive filter of L T, or Pi design. It provides a Low Pass and High Pass function. The signal separator 20 is located between the antenna portion and the match network, and is part of the match network assembly 34 in FIG. 3.

Having thus described several illustrative embodiments, it is to be appreciated that various alterations, modifications, and improvements will readily occur to those skilled in the art. Such alterations, modifications, and improvements are intended to form a part of this disclosure, and are intended to be within the spirit and scope of this disclosure. While some examples presented herein involve specific combinations of functions or structural elements, it should be understood that those functions and elements may be combined in other ways according to the present disclosure to accomplish the same or different objectives. In particular, acts, elements, and features discussed in connection with one embodiment are not intended to be excluded from similar or other roles in other embodiments.

Additionally, elements and components described herein may be further divided into additional components or joined together to form fewer components for performing the same functions.

Accordingly, the foregoing description and attached drawings are by way of example only, and are not intended to be limiting.

What is claimed is:

1. A radio communications device, comprising:
    a headphone assembly comprising at least one aural speaker or transducer and a headphone cable functioning as an antenna and providing electrical signals carrying audio information to the at least one aural speaker or transducer;
    a signal separator coupled to the headphone cable for separating the electrical signals carrying audio information transmitted to the headphone cable and radio frequency (RF) signals received from the headphone cable, wherein the signal separator comprises a simple or multistage passive filter of L, T, or Pi design;
    a radio receiver for receiving the RF signals from the signal separator and converting the RF signals to electrical signals carrying audio information;
    a tuner for tuning the headphone cable to a selected operating frequency of the radio receiver; and
    an audio amplifier for amplifying electrical signals carrying audio information from the radio receiver to be transmitted through the headphone cable to the at least one aural speaker or transducer.

2. The device of claim 1, further comprising a device housing having a headphone jack, an electrical interface, or an electro-mechanical interface, and wherein the signal separator, the radio receiver, the tuner, and the audio amplifier are located within the housing, and the headphone cable is located outside the device housing and is connected to the headphone jack, the electrical interface, or the electro-mechanical interface.

3. The device of claim 1, further comprising a device housing having a headphone jack, an electrical interface, or an electro-mechanical interface, and wherein the radio receiver and audio amplifier are located within the housing, and wherein the signal separator and the tuner are located outside the housing and are connected to the radio receiver through a second cable connected to the headphone jack, the electrical interface, or the electro-mechanical interface.

4. The device of claim 3, further comprising a second housing, wherein the signal separator and tuner are located within the second housing, and the headphone cable and second cable are connected to the second housing.

5. The device of claim 1, wherein the tuner comprises a match network and/or impedance matched tuner and a controller for controlling the match network or impedance matched tuner.

6. The device of claim 5, wherein the match network includes a plurality of inductive and/or capacitive elements and corresponding switches, and wherein the controller switches inductive and/or capacitive elements in or out of a series path to the headphone cable, allowing the cable to resonate or function as a quarter-wave, half-wave, or $n\lambda/4$ antenna, where n is any integer.

7. The device of claim 5, wherein the match network includes a plurality of inductive and/or capacitive elements and corresponding switches, and wherein the controller switches the inductive and/or capacitive elements in or out of a pi, T-, L or other matching network in a series path to the headphone cable, allowing the cable to resonate or function as a quarter-wave, half-wave, or $n\lambda/4$ antenna, where n is any integer.

8. The device of claim 5, wherein the tuner is controlled dynamically to adjust for proximity loading of the antenna in response to a control signal.

9. The device of claim 1, wherein the headphone cable comprises at least one RF cable functioning as the antenna, at least one audio conductor for providing electrical signals carrying audio information to the at least one aural speaker or transducer, and an audio/RF return or common ground.

10. The device of claim 1, wherein the operating frequency of the radio receiver comprises VHF (high), VHF (low), FM, or UHF bands.

11. The device of claim 1, wherein the radio communications device is a tablet, netbook, or notebook computer or smartphone.

12. A method of operating a radio communications device having a headphone assembly comprising at least one aural speaker or transducer and a headphone cable functioning as an antenna and providing electrical signals carrying audio information to the at least one aural speaker or transducer, the method comprising the steps of:

tuning the headphone cable to a selected operating frequency;

separating the electrical signals carrying audio information transmitted to the headphone cable and radio frequency (RF) signals received from the headphone cable, wherein separating the electrical signals is performed using a signal separator comprising a simple or multi-stage passive filter of L, T, or Pi design;

converting the RF signals to electrical signals carrying audio information; and amplifying electrical signals carrying audio information to be transmitted through the headphone cable to the at least one aural speaker or transducer.

13. The method of claim 12, further comprising a device housing having a headphone jack, an electrical interface, or an electro-mechanical interface, and wherein all steps are performed within the housing, and the headphone cable is located outside the device housing and is connected to the headphone jack, the electrical interface, or the electro-mechanical interface.

14. The method of claim 12, further comprising a device housing having a headphone jack, an electrical interface, or an electro-mechanical interface, and wherein the converting and amplifying steps are performed within the device housing, and wherein the tuning and separating steps are performed outside the device housing.

15. The method of claim 14, further comprising a second housing separated from and connected to the device housing by a second cable wherein the tuning and separating steps are performed within the second housing.

16. The method of claim 12, wherein tuning step comprises controlling a match network and/or impedance matched tuner.

17. The method of claim 16, wherein the match network includes a plurality of inductive and/or capacitive elements and corresponding switches, and the tuning step comprises switching respective inductive and/or capacitive elements in or out of a series path to the headphone cable, allowing the cable to resonate as a quarter-wave, half-wave, or $n\lambda/4$ antenna, where n is any integer.

18. The method of claim 14, wherein the tuning step comprises dynamically tuning the headphone cable to adjust for proximity loading of the antenna in response to a control signal.

19. The method of claim 12, wherein the headphone cable comprises at least one RF cable functioning as the antenna, at least one audio conductor for providing electrical signals carrying audio information to the at least one aural speaker or transducer, and an audio/RF return or common ground.

20. The method of claim 12, wherein the operating band comprises VHF (high), VHF (low), FM, or UHF bands.

21. The method of claim 12, wherein the radio communications device is a tablet, netbook, or notebook computer or smartphone.

* * * * *